Figure 1:
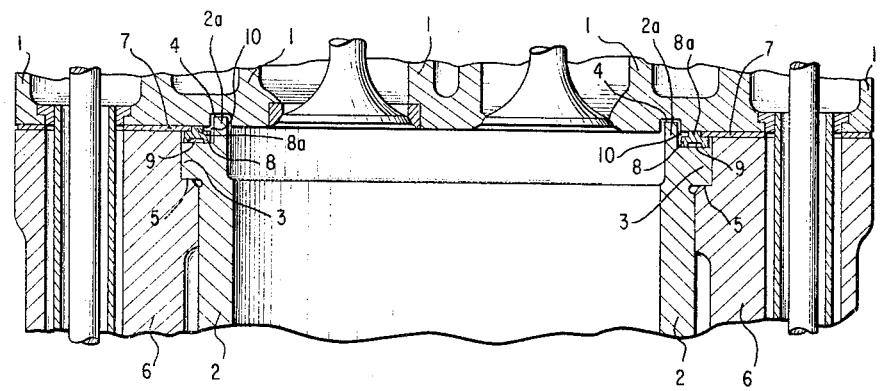

June 30, 1964   W. HÄRTING   3,139,009
CYLINDER HEAD SEAL

Filed May 16, 1962   2 Sheets-Sheet 1

INVENTOR.
WERNER HÄRTING
BY *Dicke + Craig*
ATTORNEYS 3,139,009
CYLINDER HEAD SEAL
Werner Härting, Stuttgart-Bad Cannstatt, Germany, assignor to Daimler-Benz Aktiengesellschaft, Stuttgart-Unterturkheim, Germany
Filed May 16, 1962, Ser. No. 195,343
9 Claims. (Cl. 92—171)

The present invention relates to a cylinder head sealing structure, and more particularly to a cylinder head seal for piston engines adapted to operate at high compression ratios.

It is already known in the prior art to clamp the cylinder liners of piston engines operating at high pressures, for example, of internal combustion engines, at an external liner collar between cylinder head and cylinder jacket. A disadvantage of the prior art arrangement resides in the fact that considerable alternating forces caused by the forces occurring within the cylinder are transmitted to the cylinder liner collar to which have to be added the clamping forces. The result of such an arrangement is the occurrence at the cylinder liner collar of considerable bending moments which one seeks to maintain small as possible by a corresponding dimensioning and arrangement of the clamping surfaces at the collar and at the abutment shoulders of the cylinder jacket. This, however, does not preclude the frequent occurrence at the abutment shoulders, especially of cylinder jackets consisting of light metal or light metal alloys, of cracks in the corners of the abutment shoulders and therewith a premature wear and destruction of the cylinder jacket.

The purpose of the present invention is to eliminate this drawback. This is achieved in accordance with the present invention by the fact that with the seal of the cylinder head at the cylinder liner and at the cylinder jacket, the opposite approach is pursued, namely, by an extremely hard abutment support of the cylinder head at the cylinder jacket housing and a simultaneous elastic seal betwen cylinder head and cylinder liner. The abutment insert consists of a solid steel plate which may consist, with single-cylinder engines, of a steel ring and with multi-cylinder engines, may extend over the entire length and width of the cylinder jacket surface. The elastic seal also consists of steel and is placed upon the liner collar as individual or single ring. This ring is rendered elastic by apertures or recesses provided therein. Additionally, this elastic sealing ring is shielded and protected against the hot gases by a separate shielding ring provided at the cylinder liner or by a liner section projecting beyond the clamping collar.

Sealing rings are known in the prior art having a U-shaped cross section which press with the sharp-edged shoulders and ribs thereof against the cylinder head and the cylinder liner. However, these prior art sealing rings have no spring-characteristics but instead are deformed plastically under the influence of the clamping pressure whereby the entire forces are transmitted as heretofore to the liner collar which, however, is to be avoided precisely by the present invention.

It is also known in the prior art to protect the sealing gap against the hot gases by a shielding ring or a collar-like projecting liner section whereby the ring simultaneously engages with play into an annular groove of the cylinder head. Such an arrangement is claimed herein only in combination with the primary features of the present invention as described and claimed herein. This labyrinth seal in front of the elastic seal and of the seal at the rigid abutment support is of particular advantage because any relatively soft seal such as made, for example, of asbestos or the like is dispensed with thereby.

Accordingly, it is an object of the present invention to provide a cylinder head seal for piston engines, especially for internal combustion engines, which effectively eliminates the shortcomings and drawbacks encountered in the prior art constructions.

It is another object of the present invention to provide a cylinder head seal construction which effectively eliminates, by simple means, the transmission of alternating forces produced by the forces occurring within the cylinder to the collar portion of the cylinder liner.

Still a further object of the present invention resides in the provision of a cylinder head seal construction which prevents the occurrence of considerable bending moments at the collar portion of the cylinder liner and which also prevents the formation of cracks in the corners of the abutment shoulders in the cylinder jacket, especially in connection with cylinder jackets made of light metal or light metal alloys.

A still further object of the present invention resides in the provision of a cylinder head seal arrangement, especially for internal combustion engines, which effectively prevents the premature wear and tear of the cylinder jacket.

Still another object of the present invention resides in the provision of a cylinder head seal arrangement, particularly for internal combustion engines which dispenses with the need of seals made of relatively soft material.

These and other objects, features and advantages of the present invention will become more obvious from the following description when taken in connection with the accompanying drawing which shows, in the single figure thereof, for purposes of illustration only, one embodiment in accordance with the present invention.

Figure 2:
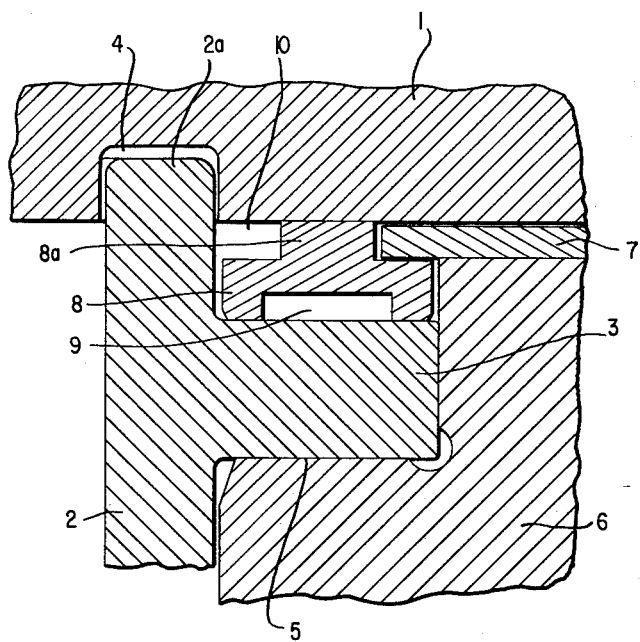

Referring now to the drawing, FIGURE 1 shows a cross sectional view through the upper portion of an internal combustion engine cylinder provided with the cylinder head seal arrangement in accordance with the present invention, and FIGURE 2 shows a partial cross sectional view on an enlarged scale of the cylinder head seal arrangement of FIGURE 1.

In both figures, reference numeral 1 designates therein the cylinder head while reference numeral 2 designates therein the cylinder liner and reference numeral 3 the clamping collar portion of the cylinder liner 2. The liner end section 2a extending beyond the collar portion 3 protrudes as a shielding collar with universal play into an annular groove 4 provided within the cylinder head 1. The collar portion 3 rests on a counter-shoulder 5 of the cylinder jacket housing 6. The arrangement so far described is known per se in the prior art and forms no part of the present invention except in combination with the features to be described more fully hereinafter.

The present invention consists in the fact that there is disposed between the cylinder head 1 and the surface of the housing 6 a solid steel plate 7 which absorbs the principal portion of the clamping pressure, transmits the same to the housing 6 and thereby relieves the clamping collar portion 3 and in particular the shoulder 5 from this pressure. In addition to the aforementioned annular or ring gap seal 4, a relatively wide elastic seal ring 8 which is shielded against the hot gases by the labyrinth seal 2a, 4 and which is stepped or offset to an upper relatively narrower ring portion 8a extends over the sealing area. The ring 8 is provided at the lower side thereof with an annularly-shaped recess or aperture 9 whereby the ring receives a bridge or U-shaped cross section. The ring 8 abuts with the upper flat side of the narrower portion 8a against the cylinder head and with the U-shaped leg portions against the liner collar portion 3. The ring 8, 8a yields elastically upon tightening the cylinder head bolts.

In case of necessity, a further sealing ring may be inserted into the space 10 between the cylinder liner portion 2a and the annular portion 8a. The abutment plate 7 extends, at the lower side of the annular portion 8a, over the shoulder of the ring section 8 and therewith forms a further sealing place. The sealing ring 8, 8a is thereby centered also by the liner section 2a extending into groove 4.

While I have shown and described one embodiment in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:

1. A cylinder head seal, especially for internal combustion engines comprising a cylinder head and cylinder means provided with cylinder liner means, said cylinder liner means including a liner collar portion, and means transmitting pressure from said cylinder head to said liner comprising elastic metallic seal means between said cylinder head and said collar portion, and means effectively shielding said elastic seal means against the effect of the hot combustion gases, said elastic seal means comprising a yieldable metallic ring member having a portion of U-shaped cross section adapted for yielding movement in response to relative movement of said cylinder head and said cylinder means toward each other, means for limiting said pressure and said yielding movement comprising extremely hard metallic abutment means between said cylinder head and said cylinder means, said abutment means consisting of a solid metal plate.

2. A cylinder head seal, especially for internal combustion engines having a cylinder head and cylinder means provided with cylinder liner means, including a liner collar portion, and means transmitting pressure between said cylinder head and said collar portion comprising an elastic seal means between said cylinder head and said collar portion, said elastic seal means comprising a metallic ring member having an annular groove therein, the open side of said groove facing said liner collar portion, said ring member being subject to elastic deformation by relative movement of said cylinder head and cylinder means, and means limiting such relative movement and said pressure comprising an extremely hard solid plate constituting an abutment means and disposed between said cylinder head and said cylinder means.

3. A cylinder head seal, especially for internal combustion engines having a cylinder head and cylinder means provided with cylinder liner means, comprising extremely hard abutment means between said cylinder head and said cylinder means, said cylinder liner means including a liner collar portion, and elastic seal means between said cylinder head and said collar portion, and means effectively shielding said elastic seal means and said abutment means against the effect of the hot combustion gases, said abutment means consisting of a solid plate whereas said elastic seal means comprises a yieldable metallic ring having a portion of U-shaped cross section adapted to yield in response to relative movement between said cylinder head and cylinder means, said relative movement being limited by the abutting engagement of said cylinder head and said cylinder means with said solid plate.

4. A cylinder head seal, especially for internal combustion engines having a cylinder head and cylinder means provided with cylinder liner means, including a liner collar portion supported by said cylinder means, and elastic seal means made of steel between said cylinder head and said collar portion, said elastic seal means comprising a ring having a U-shaped cross sectional portion contacting said liner collar portion and yieldable in response to relative movement between said cylinder head and cylinder means, and extremely hard steel supporting means between said cylinder head and said cylinder means for limiting the extent of said relative movement.

5. A cylinder head seal, especially for internal combustion engines having a cylinder head and cylinder means provided with cylinder liner means, comprising extremely hard steel supporting means between said cylinder head and said cylinder means, said cylinder liner means including a liner collar portion, and elastic seal means made also of steel between said cylinder head and said collar portion, and means effectively shielding said elastic seal means and said supporting means against the effect of the hot combustion gases, said supporting means consisting of a solid plate whereas said elastic seal means comprises a ring having a portion of U-shaped cross section, the ends of the legs of said U-shaped cross-sectional portion abutting an upwardly facing surface of said liner collar portion.

6. In a piston engine, especially in an internal combustion engine having a cylinder head, cylinder means provided with liner means having a collar portion, and a cylinder head sealing arrangement, the improvement essentially consisting of metallic supporting means between said cylinder head and said cylinder means for absorbing the principal portion of the clamping pressure and of elastic metallic seal means between said cylinder head and said collar portion, said elastic metallic seal means comprising an elastically deformable ring member having spaced depending leg portions in contact with said collar portion.

7. A cylinder head seal, especially for internal combustion engines having a cylinder head and cylinder jacket means, comprising extremely rigid abutment support means between said cylinder head and said cylinder jacket means, cylinder liner means including an external cylinder liner collar portion, said cylinder liner means being secured in the axial direction thereof at said liner collar between said cylinder head and said cylinder jacket means, and elastic seal means between said cylinder head and said collar portion including a relatively wide ring having a narrower portion at the upper side thereof and provided with an annular groove along the lower side thereof to impart the lower portion to said wide ring an approximately U-shaped cross section, and means effectively shielding said elastic seal means and said supporting means against the effect of the hot combustion gases including a cylinder liner section extending into an annular groove provided in said cylinder head and centering said relatively wide ring.

8. In a piston engine, especially in an internal combustion engine having a cylinder head, cylinder means provided with liner means having a collar portion, and a cylinder head sealing arrangement, the improvement essentially consisting of metallic supporting means between said cylinder head and said cylinder means for absorbing the principal portion of the clamping pressure, and of elastic metallic seal means between said cylinder head and said collar portion, said supporting means consisting of a solid plate whereas said elastic seal means comprises a ring member having a U-shaped cross sectional portion abutting said collar portion and a relatively narrow annular portion abutting said cylinder head.

9. A cylinder head seal, especially for internal combustion engines having a cylinder head and cylinder jacket means provided with cylinder liner means secured in the axial direction thereof between said cylinder head and said cylinder jacket means, said cylinder liner means comprising an external collar portion, said seal comprising a relatively wide sealing ring disposed between said cylinder head and said collar portion, said sealing ring being provided on the side thereof facing said collar portion with an annular groove having a U-shaped cross-sectional wall portion supported on said collar portion, said sealing ring being provided on the side thereof facing said cylinder head with a relatively narrow portion defining with said wall portion inner and outer annular shoulders, means effectively shielding said sealing ring against the effect of the hot combustion gases including a cylinder liner section extending into an annular groove provided in said cylinder head, means for limiting pressure applied from said cylinder head to said sealing ring and said external collar portion comprising an extremely hard steel plate disposed between said cylinder head and said cylinder jacket means, said hard steel plate comprising an inner annular rim portion projecting over said annular outer shoulder of said sealing ring.

References Cited in the file of this patent

UNITED STATES PATENTS

| | | |
|---|---|---|
| 1,678,946 | Joyce | July 31, 1928 |
| 2,299,695 | Greene | Oct. 20, 1942 |
| 2,339,479 | McCreary | Jan. 18, 1944 |
| 2,679,241 | Dickson | May 25, 1954 |
| 2,717,793 | Nenzell | Sept. 13, 1955 |
| 2,849,263 | Johnston | Aug. 26, 1958 |
| 2,939,753 | Schilling et al. | June 7, 1960 |
| 3,037,460 | Guest et al. | June 5, 1962 |